US009211823B2

(12) United States Patent
Campa

(10) Patent No.: US 9,211,823 B2
(45) Date of Patent: Dec. 15, 2015

(54) PILLOW HOLDER SYSTEMS

(76) Inventor: Sharon Campa, Mesa, AZ (US)

( * ) Notice: Subject to any disclaimer, the term of this patent is extended or adjusted under 35 U.S.C. 154(b) by 1053 days.

(21) Appl. No.: 12/479,793

(22) Filed: Jun. 6, 2009

(65) Prior Publication Data

US 2009/0309406 A1 Dec. 17, 2009

Related U.S. Application Data

(60) Provisional application No. 61/131,974, filed on Jun. 13, 2008.

(51) Int. Cl.
*B60N 2/48* (2006.01)
*B60N 2/24* (2006.01)
(52) U.S. Cl.
CPC .............. *B60N 2/4879* (2013.01); *B60N 2/245* (2013.01)
(58) Field of Classification Search
CPC .............................. B60N 2/245; B60N 2/4879
USPC .......................................... 297/391, 393, 397
See application file for complete search history.

(56) References Cited

U.S. PATENT DOCUMENTS

| 4,097,086 A * | 6/1978 | Hudson ...................... 297/217.1 |
| 4,165,125 A | 8/1979 | Owen |
| 4,776,049 A * | 10/1988 | Perron .............................. 5/640 |
| 5,015,036 A | 5/1991 | Fergie |
| 5,345,633 A * | 9/1994 | Harnish ............................. 5/639 |
| 5,503,456 A * | 4/1996 | Rossini ......................... 297/397 |
| 5,538,323 A * | 7/1996 | Henkel ......................... 297/397 |
| 6,030,034 A * | 2/2000 | Plohetski ................. 297/188.06 |
| 6,435,617 B1 | 8/2002 | McNair |
| 6,641,220 B2 * | 11/2003 | Clegg ............................ 297/397 |
| 6,942,297 B2 * | 9/2005 | Johnson ....................... 297/397 |
| 6,957,462 B1 * | 10/2005 | Wilcox ............................ 5/636 |
| D564,807 S * | 3/2008 | Da Re ............................ D6/501 |
| 7,441,292 B2 | 10/2008 | Williams et al. |
| 2002/0163240 A1* | 11/2002 | Cheng .......................... 297/397 |
| 2008/0036253 A1* | 2/2008 | Lee ............................... 297/220 |

* cited by examiner

*Primary Examiner* — Philip Gabler
(74) *Attorney, Agent, or Firm* — Keith L. Jenkins, Registered Patent Attorney, LLC; Keith L. Jenkins

(57) ABSTRACT

Pillow holders that have a sleeve for receiving and retaining a pillow coupled, optionally releasably, to a flexible and resilient enclosure (optionally less than a complete enclosure) for a headrest. The enclosure stretches over the headrest. The sleeve is made of a flexible and resilient material, and is coupled to the enclosure at a position that places the pillow in position to support the neck of the user of the headrest. The enclosure may optionally have a strap. The strap may be releasably and/or slidingly coupled to the enclosure. Optionally, the tube or sleeve may also be slidingly coupled to the strap. The pillow holder is designed for pillows of various shapes and sizes, including standard-sized pillows and stuffed toys. The enclosure may additionally be coupled to headrest supports. More than one enclosure may be coupled to one strap. The strap may optionally be worn as a shoulder strap.

19 Claims, 11 Drawing Sheets

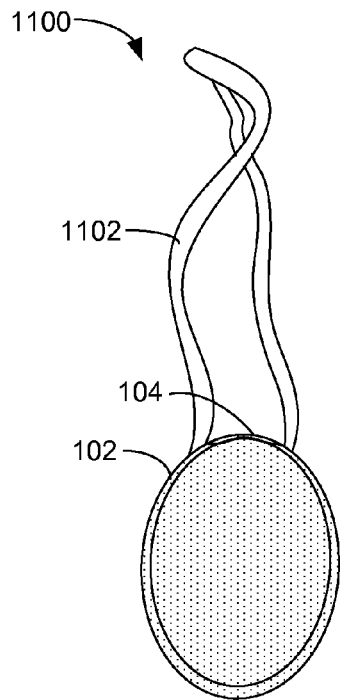
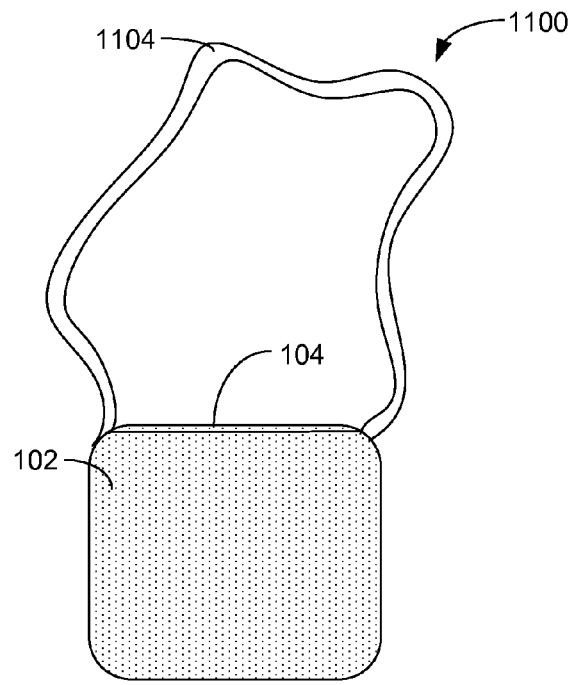
FIG. 11A  FIG. 11B
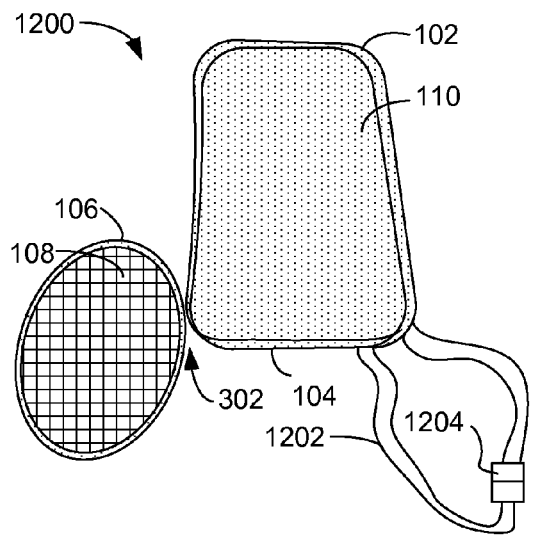
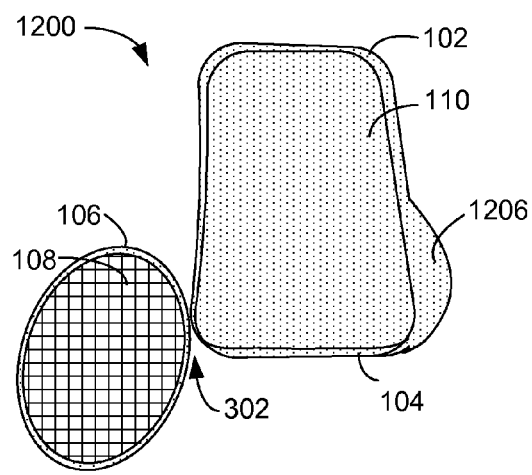
FIG. 12A  FIG. 12B

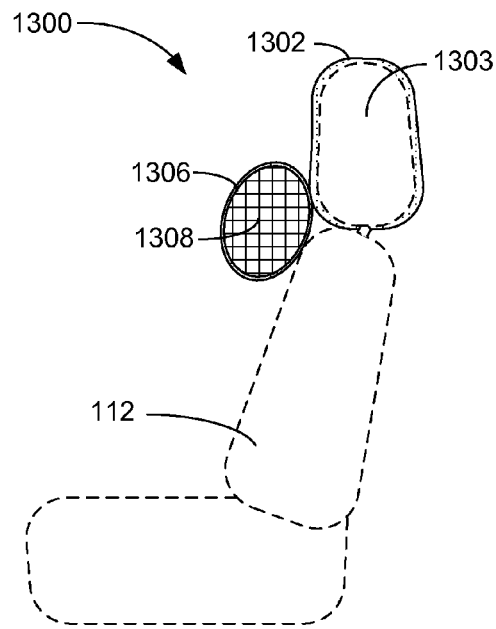
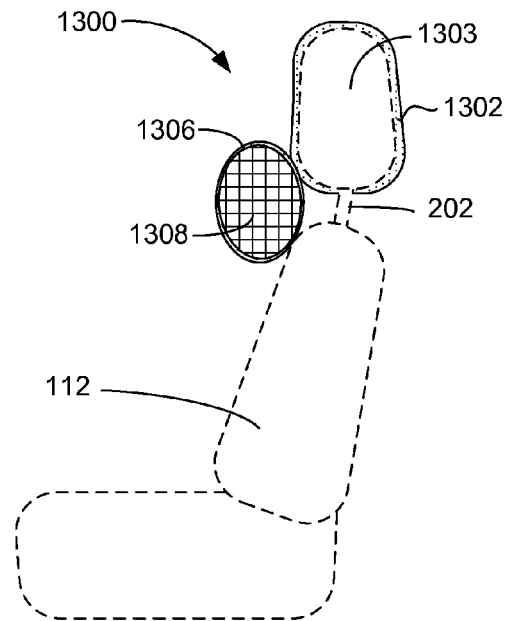
FIG. 13
FIG. 14
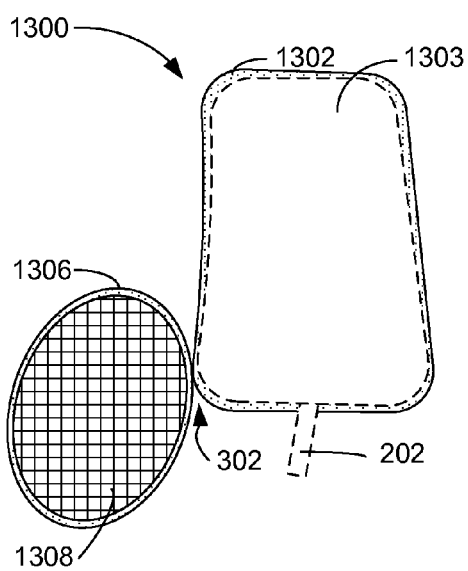
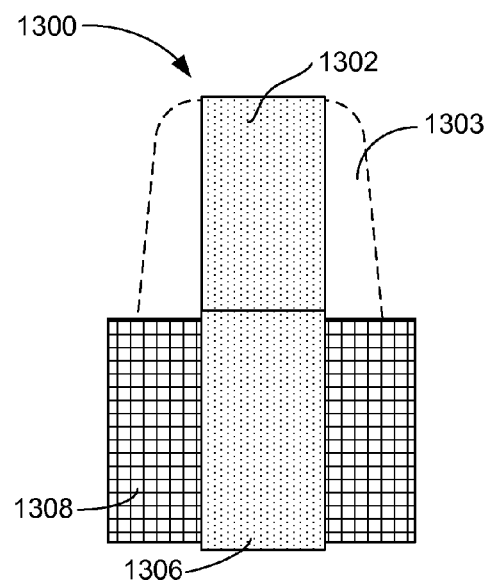
FIG. 15
FIG. 16

PILLOW HOLDER SYSTEMS

RELATED APPLICATIONS

This application claims the benefit of US provisional patent application 61/131,974 for a Pillow Holder, filed Jun. 13, 2008 by the same inventor.

FIELD OF THE INVENTION

This invention relates to pillow holders for neck and back pillows. More particularly, it relates to a pillow holder that may alternatively be coupled to a headrest of any sort or worn on the body by a strap. Yet more particularly, the invention includes pillow holders that are custom made for particular headrests.

BACKGROUND

Despite broad innovation in the area of neck pillows, a need for a means for holding pillows in place when supporting the neck and/or back remains insufficiently addressed.

Particularly for children and sick or physically disabled persons, a device for holding a neck or back pillow in place that meets special needs is lacking. Effective pillow holders adapted to wheelchairs and child seats are generally not available.

U.S. Pat. No. 7,410,218 to Kotani discloses a neck-support adjustably, permanently, and pivotably attached to a headrest, requiring special manufacturing of the headrest. U.S. Pat. No. 6,942,297 to Johnson discloses a lateral-support headrest held on to the seat with straps. U.S. Pat. No. 6,135,560 to Fagg discloses a neck, head, and shoulder pillow combined in a single device. U.S. Pat. No. 6,033,023 discloses an inflatable lateral headrest that is held in place between two seats or between a headrest and a seat top.

U.S. Pat. No. 5,538,323 to Henkel discloses a neck rest that is supported by a headrest and dangles from the top of the headrest. Henkel discloses enveloping the headrest with fabric to support his neck rest. Henkel claims the seat and headrest, as well as the neck support.

U.S. Pat. No. 5,503,456 to Rossini discloses a headrest that straps onto a chair with elastic straps and maintains a pillow in a case. U.S. Pat. No. 5,015,036 to Fergie discloses a headrest that straps onto an existing car headrest. U.S. Pat. No. 4,274,673 to Kifferstein discloses a disposable bi-lateral headrest. U.S. Pat. No. 4,165,125 discloses a headrest pillow that slips over the top of a seat back and receives a foam pillow in a front pocket of the cover.

A need still exists for a pillow holder that can hold various pillows in place in a seat or other sedentary situation. A further need is for a pillow holder that is easy to use, cheap to manufacture, washable, and adaptable to a variety of situations. A further need is for a pillow holder adapted to various types, shapes, and sizes of pillows. A further need is for a pillow holder able to support both a back and a neck pillow simultaneously. A further need is for a pillow holder that packs away into a easily carried form, without discrete or dedicated packaging. A further need is for a pillow holder that is amusing to children. A further need is for a pillow holder that can support a pillow in a position to support the neck, rather than being just an additional layer to a headrest. Another need is for a pillow holder that is adaptable to various headrests, including those on vehicle seats, wheelchairs, and the like.

OBJECTS AND FEATURES OF THE INVENTION

A primary object and feature of the present invention is to overcome the above-mentioned problems and fulfill the above-mentioned needs. Another object and feature of the present invention is to provide a pillow holder that can support a pillow in position to support the neck of a person who is using a headrest. It is a further object and feature of the present invention to provide a pillow holder that packs away without additional packaging.

It is a further object and feature of the present invention to provide a strap for the package for easy transport. It is a further object and feature of the present invention to provide a pillow holder that is slidingly attached to the strap. It is a further object and feature of the present invention to provide a second pillow holder for a second pillow slidingly attached to the strap. It is a further object and feature of the present invention to provide a pillow holder that provides room to stuff the strap between the pillow holder and the headrest when the pillow holder is in use on a headrest. It is a further object and feature of the present invention to provide a pillow holder with a strap that is releasably connectable to the enclosure of the package. It is a further object and feature of the present invention to provide a pillow holder where the enclosure is slidingly coupled to the strap and the sleeve or tube is also slidingly attached to the strap, and where the tube and the enclosure are releasably coupled such that the tube (with the pillow) and the enclosure may be separately positioned on the strap. It is a further object and feature of the present invention to provide a pillow holder wherein the pillow is slidingly coupled to the strap via a tube or sleeve and the pillow is a stuffed toy, such as a teddy bear or the like. It is a further object and feature of the present invention to provide a pillow holder with an enclosure that receives the strap through an opening in the bottom of the enclosure (distal the flexible closure of the enclosure) and through a strap guide attached to the interior surface of the enclosure, and ejects the strap through the flexible closure of the enclosure.

It is a further object and feature of the present invention to provide a pillow holder that receives a pillow into a resilient and flexible tube or sleeve that is attachable or attached to a resilient and flexible enclosure for the headrest. It is a further object and feature of the present invention to provide a pillow holder that may be made from a single rectangle of fabric. It is a further object and feature of the present invention to provide a pillow holder that may be made from two rectangles of fabric. It is a further object and feature of the present invention to provide a pillow holder that may be secured to a headrest using hook and loop fasteners. It is a further object and feature of the present invention to provide a pillow holder that may be sold without a pillow or pillows.

It is a further object and feature of the present invention to provide a pillow holder adapted for wheelchair headrests. It is a further object and feature of the present invention to provide a pillow holder wherein the enclosure of the headrest is partial, as by a releasably connectable band of fabric vertically disposed around the headrest. It is a further object and feature of the present invention to provide that pillow holder with an additional releasably connectable horizontal band of fabric coupled to the vertical band of fabric. It is a further object and feature of the present invention to provide a pillow holder that couples to the support legs of a headrest by means of flexible couplings.

It is an additional primary object and feature of the present invention to provide such a system that is efficient, inexpensive and handy. Other objects and features of this invention will become apparent with reference to the following descriptions.

SUMMARY OF THE INVENTION

A pillow holder including: a flexible and resilient fabric enclosure having a flexible closure; a flexible coupling able to be coupled to the flexible and resilient fabric enclosure and able to couple a first pillow to the flexible and resilient fabric enclosure; and where the flexible and resilient fabric enclosure is sized and shaped to receive and retain at least a portion of a headrest of a vehicle through the flexible closure to support the first pillow, when the pillow is coupled to the flexible and resilient fabric enclosure, in a position to enable the first pillow to serve as a support for a user of such headrest. The pillow holder, where the flexible and resilient fabric enclosure is able to receive the first pillow and at least a portion of the coupling when the flexible and resilient fabric enclosure is not receiving at least a portion of the headrest. The pillow holder, where the coupling includes a flexible and resilient fabric tube that is attached to or integral to the flexible and resilient fabric enclosure and is able to receive and retain the first pillow. The pillow holder, further including a strap coupled to the flexible and resilient fabric enclosure. The pillow holder, further including a second pillow slidingly coupled to the strap, where the second pillow includes: a standard-sized second pillow; a compressible and expandable second pillow able to be compressed into a container that is part of the sliding coupling of the second pillow; or a stuffed toy. The pillow holder, where the strap is slidingly coupled to the flexible and resilient fabric enclosure. The pillow holder, where the second pillow is coupled to the flexible and resilient fabric enclosure by being slidingly coupled to the strap where the second pillow includes: a standard-sized second pillow; a compressible and expandable second pillow able to be compressed into a container that is part of the sliding coupling of the second pillow; or a stuffed toy. The pillow holder, where the strap enters the flexible and resilient fabric enclosure through an opening distal the flexible closure and exits the flexible and resilient fabric enclosure through the flexible closure. The pillow holder, where the flexible and resilient fabric enclosure is further able to receive and retain at least a portion of the strap while receiving and retaining such headrest. The pillow holder, where the strap includes a releasably coupled strap. The pillow holder, where the flexible closure includes an elastic closure or a drawstring closure. The pillow holder, where the flexible and resilient fabric enclosure is not entire.

A pillow holder including: a flexible and resilient fabric enclosure having a opening and a flexible closure; a coupling coupled to the flexible and resilient fabric enclosure and able to couple a first pillow to the flexible and resilient fabric enclosure; where the flexible and resilient fabric enclosure is sized and shaped to receive and retain at least a portion of a headrest of a vehicle through the flexible closure to support the first pillow, when the pillow is coupled to the flexible and resilient fabric enclosure, in a position to enable the first pillow to serve as a support for a user of such headrest; and where the flexible and resilient fabric enclosure is able to receive the first pillow and at least a portion of the coupling when the flexible and resilient fabric enclosure is not receiving the at least the portion of the headrest. The pillow holder, where the coupling includes a flexible and resilient fabric tube that is one of attachable to and integral to the flexible and resilient fabric enclosure and is able to receive and retain the first pillow. The pillow holder, further including a strap coupled to the flexible and resilient fabric enclosure. The pillow holder, where the strap is slidingly coupled to the flexible and resilient fabric enclosure. The pillow holder, further including a second pillow that is coupled to the flexible and resilient fabric enclosure by being slidingly coupled to the strap where the second pillow includes a standard-sized second pillow; a compressible and expandable second pillow able to be compressed into a container that is part of the sliding coupling of the second pillow; or a stuffed toy. The pillow holder, where the flexible and resilient fabric enclosure is further able to receive and retain at least a portion of the strap while receiving and retaining such headrest. The pillow holder, where the flexible and resilient fabric enclosure is not entire.

A pillow holder including: a flexible and resilient fabric enclosure having an opening and a flexible closure, where the flexible and resilient fabric enclosure includes a complete enclosure or a partial enclosure and further includes a unitary enclosure or a multi-part enclosure; a coupling coupled to the flexible and resilient fabric enclosure and able to couple a first pillow to the flexible and resilient fabric enclosure, where the coupling includes a flexible and resilient fabric tube that is attached to or integral to the flexible and resilient fabric enclosure and is able to receive and retain the first pillow; and a strap coupled to the flexible and resilient fabric enclosure, where the strap is releasably coupled to the flexible and resilient fabric enclosure, slidingly coupled to the flexible and resilient fabric enclosure, or fixedly coupled to the flexible and resilient fabric enclosure; where the flexible and resilient fabric enclosure is sized and shaped to receive and retain: at least a portion of a headrest through the flexible closure to support the first pillow, when the first pillow is coupled to the flexible and resilient fabric enclosure in a position to enable the first pillow to serve as a support for a user of such headrest; and at least a portion of the strap; where the flexible and resilient fabric enclosure is able to receive the first pillow and at least a portion of the coupling when the flexible and resilient fabric enclosure is not receiving the at least the portion of the headrest; and further including a second pillow slidingly coupled to the strap, where the second pillow includes a standard-sized second pillow, a compressible and expandable second pillow able to be compressed into a container that is part of the sliding coupling of the second pillow, or a stuffed toy.

BRIEF DESCRIPTION OF THE DRAWINGS

The above and other objects and advantages of the present invention will become more apparent from the following description taken in conjunction with the following drawings in which:

FIG. 11A is a side elevation view illustrating the exemplary pillow holder of FIG. 1 showing the tube and pillow tucked into the enclosure and an exemplary strap coupled to the enclosure, according to a preferred embodiment of the present invention;

FIG. 11B is a front elevation view illustrating the exemplary pillow holder of FIG. 1 showing the tube and pillow tucked into the enclosure and an exemplary strap coupled to the enclosure, according to a preferred embodiment of the present invention;

FIG. 12A is a side elevation view illustrating the exemplary pillow holder of FIG. 1 showing an exemplary strap coupled to the enclosure, according to a preferred embodiment of the present invention;

FIG. 12B is a side elevation view illustrating the exemplary pillow holder of FIG. 1 showing an exemplary strap tucked into the enclosure behind the headrest, according to a preferred embodiment of the present invention;

FIG. 13 is a side elevation view illustrating another exemplary pillow holder showing the enclosure as a vertical band of fabric, according to a preferred embodiment of the present invention;

FIG. 14 is a side elevation view illustrating the exemplary pillow holder of FIG. 13 with the headrest raised, according to a preferred embodiment of the present invention;

FIG. 15 is a side elevation view illustrating the exemplary pillow holder of FIG. 13, according to a preferred embodiment of the present invention;

FIG. 16 is a front elevation view illustrating the exemplary pillow holder of FIG. 13, according to a preferred embodiment of the present invention;

DETAILED DESCRIPTION OF THE BEST MODES AND PREFERRED EMBODIMENTS OF THE INVENTION

Figure 1:
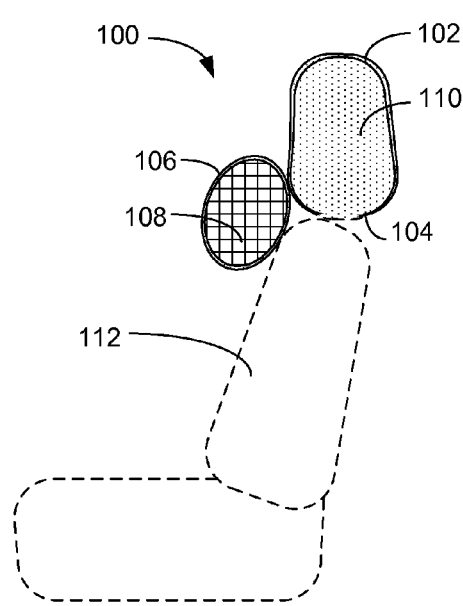
FIG. 1 is a side elevation view illustrating an exemplary pillow holder according to a preferred embodiment of the present invention.

FIG. 1 is a side elevation view illustrating an exemplary pillow holder 100 according to a preferred embodiment of the present invention. Car seat 112 has an extendable and retractable headrest 110, or 1303, (see FIG. 13). Pillow holder 100 has a flexible and resilient fabric enclosure 102 with a flexible closure 104 coupled to a flexible and resilient tube 106, or sleeve 106. Flexible closure 104 may be formed with an elastic band, draw strings, or the like. Flexible closure 104 may not fully close when the enclosure 102 is installed on the headrest 1303, but may close completely when the enclosure is not installed on the headrest 1303. Flexible and resilient tube 106, or sleeve 106, is operable to receive and retain a pillow 108 and to couple a pillow 108 to flexible and resilient fabric enclosure 102. The pillow holder 100 may be sold with or without pillow 108. In a preferred embodiment, flexible and resilient tube 106, or sleeve 106 is integral to flexible and resilient fabric enclosure 102. In an alternate embodiment, flexible and resilient tube 106, or sleeve 106 is coupled to flexible and resilient fabric enclosure 102.

Flexible and resilient fabric enclosure 102, is sized and shaped to receive and retain at least a portion of a headrest 110 of a vehicle through said flexible closure 104 to support the pillow 108, when the pillow 108 is coupled to the flexible and resilient fabric enclosure 102, in a position to enable the pillow 108 to serve as a support (preferably a neck support) for a user of the headrest 110. The flexible and resilient fabric enclosure 102 fits stretchingly over the headrest 110, much as a knit ski mask fits over a person's head, and the flexible closure 104 constricts, either elastically or by draw strings being tightened, around the bottom of the headrest 110. The flexible coupling 302 (see FIG. 3) between the flexible and resilient fabric enclosure 102 and the flexible and resilient tube 106, or sleeve 106, is positioned such that the pillow 108 and flexible and resilient tube 106, or sleeve 106, will support a user's neck.

Flexible and resilient tube 106, or sleeve 106 can receive and retain a variety of shapes and sizes of pillows, but is preferably designed to take a standard-sized pillow 108, as are known in the commerce of pillows 108.

Figure 2:
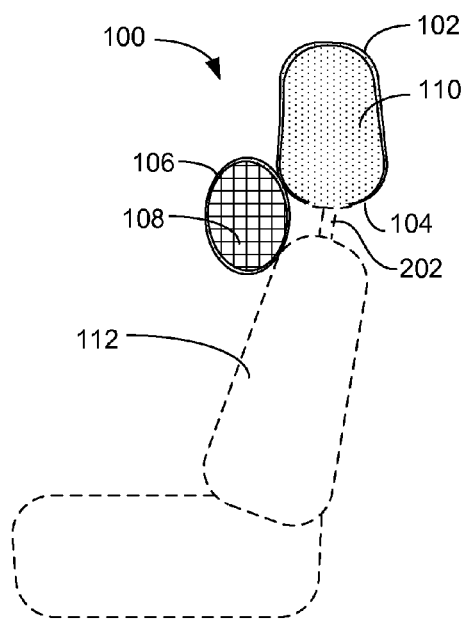
FIG. 2 is a side elevation view illustrating the exemplary pillow holder of FIG. 1 according to a preferred embodiment of the present invention.

FIG. 2 is a side elevation view illustrating the exemplary pillow holder 100 of FIG. 1 according to a preferred embodiment of the present invention. Here headrest 110 is extended on headrest supports 202 and, while the flexible and resilient tube 106, or sleeve 106 and pillow 108 has changed position, pillow 108 is still in position to support a user's neck. While the exemplary seat 112 is illustrated as a car seat 112, pillow holders 100 for vehicle seats 112 of various designs in various types of vehicles, such as, without limitation, mining trucks, dune buggies, and wheels chairs, are within the scope of the invention.

Figure 3:
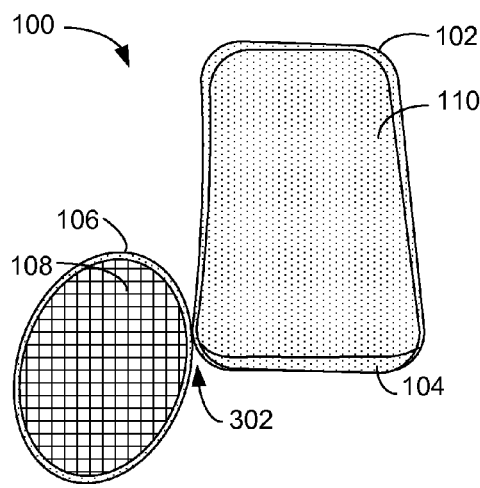
FIG. 3 is a side elevation view illustrating the exemplary pillow holder of FIG. 1 according to a preferred embodiment of the present invention.

FIG. 3 is a side elevation view illustrating the exemplary pillow holder 100 of FIG. 1 according to a preferred embodiment of the present invention. The flexible coupling 302 may be permanently sewn or may be a releasable flexible coupling 302. For example, flexible coupling 302 may be a hook and loop coupling. Preferably, the flexible coupling 302 is entire along the side-to-side dimension of the pillow holder 100. IN an alternate embodiment, the flexible coupling 302 may be less than entire. Those of skill in the art, enlightened by the present disclosure, will appreciate the wide variety of flexible couplings 302 that may be used.

Figure 4:
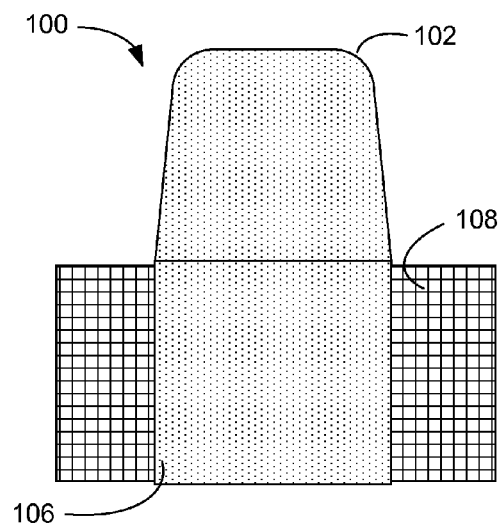
FIG. 4 is a front elevational view illustrating the exemplary pillow holder of FIG. 1 according to a preferred embodiment of the present invention.

FIG. 4 is a front elevational view illustrating the exemplary pillow holder 100 of FIG. 1 according to a preferred embodiment of the present invention. Pillow 108 extends outside of the flexible and resilient tube 106, or sleeve 106. The resiliency of the flexible and resilient tube 106, or sleeve 106 retains the pillow 108. Flexible and resilient fabric enclosure 102 covers substantially all of the top, side, front and back surfaces of the headrest 1303, as well as a portion of the bottom surface of headrest 110.

Figure 5:
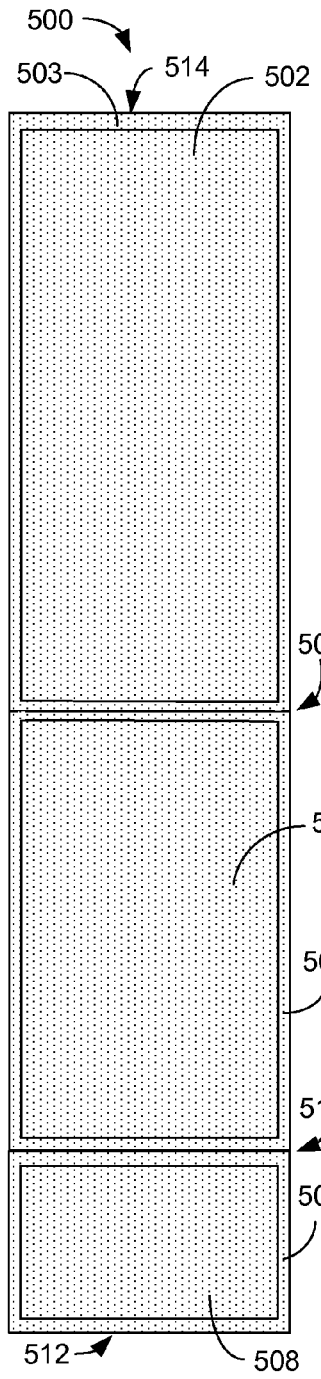
FIG. 5 is a top plan view illustrating an exemplary fabric pattern using one rectangle of fabric for the exemplary pillow holder of FIG. 1 according to a preferred embodiment of the present invention.

FIG. 5 is a top plan view illustrating an exemplary fabric pattern 500 using one rectangle of fabric for the exemplary pillow holder 100 of FIG. 1 according to a preferred embodiment of the present invention. Section 506 forms the flexible and resilient tube 106, or sleeve 106, when lines 504 and 510 are sewn together. Section 506 has hem allowance 505. Sections 502 and 508 form the flexible and resilient fabric enclosure 102 when side edges of sections 502 and 506 are sewn together and are gathered. Flexible closure 104 is formed along edges 512 and 514. Section 502 has a sewing allowance 503 and section 508 has sewing allowance 507. The position of the flexible coupling 302 (along lines 504 and 510 when sewn together) relative to the bottom of the headrest is determined by the relative lengths of sections 502 and 508. The size of the pillow 108 to be received and retained by flexible and resilient tube 106, or sleeve 106, is determined by the length of section 506.

Figure 6A:
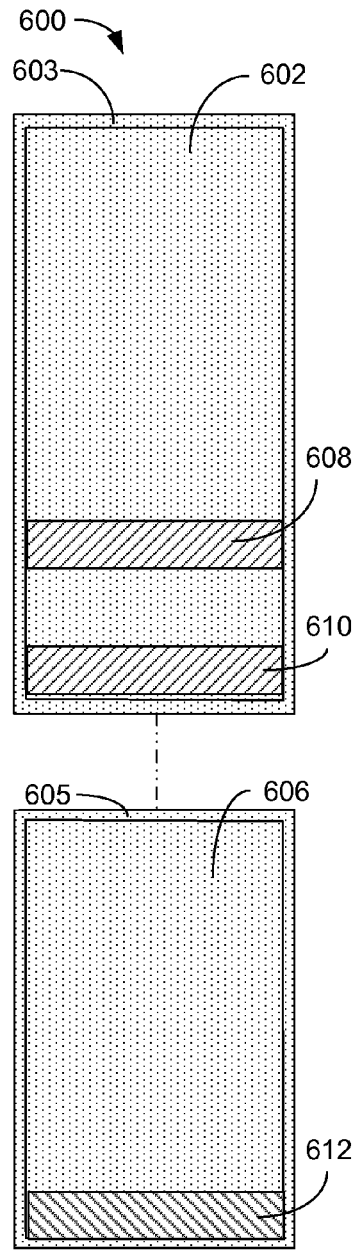
FIG. 6A is a top plan view illustrating a second exemplary fabric pattern using two rectangles of fabric for an exemplary pillow holder, according to a preferred embodiment of the present invention.

FIG. 6A is a top plan view illustrating a second exemplary fabric pattern 600 using two rectangles of fabric for an exemplary pillow holder 2300 (see FIG. 23), according to a preferred embodiment of the present invention. Panel 602 forms a flexible and resilient fabric enclosure 102 in the form of a vertical band 1302 that stretches around headrest 1303 and releasably fastens at the ends (see FIGS. 13-16). Panel 602 has sewing allowance 603 and flexible hook fastener webs 608 and 610. Panel 606 fastens together at the ends to form flexible and resilient tube 1306, or sleeve 1306 (see FIGS. 13-16). Panel 606 has sewing allowance 605 and loop fastener web 612. In alternate embodiments, other types of fasteners may be used.

Figure 6B:
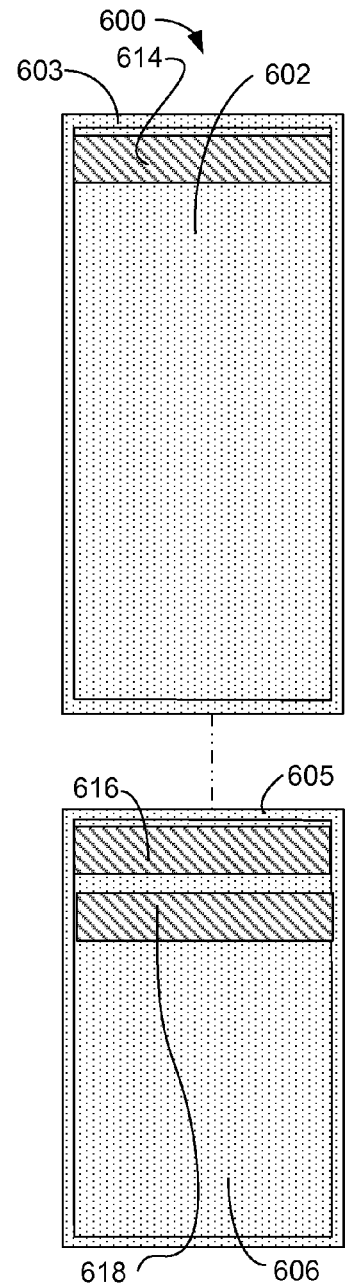
FIG. 6B is a bottom plan view illustrating a second exemplary fabric pattern using two rectangles of fabric for an exemplary pillow holder, according to a preferred embodiment of the present invention.

FIG. 6B is a bottom plan view illustrating the second exemplary fabric pattern of FIG. 6A using two rectangles of fabric for an exemplary pillow holder 1300, according to a preferred embodiment of the present invention. Panel 602 has a loop fastener web that connects to hook fastener web 610 to form and secure the vertical band 1302, an embodiment of a flexible and resilient fabric enclosure 1302. Panel 606 has loop fastener web 616 that releasably fastens to hook fastener web 612 to form flexible and resilient tube 1306, or sleeve 1306. Panel 606 has also loop fastener web 618 that releasably fastens to hook fastener web 608 to releasably couple flexible and resilient tube 1306, or sleeve 1306 to flexible and resilient fabric enclosure 1302. The location of hook fastener web 608 on panel 602 ultimately determines the position of the pillow 108 in relation to the headrest 1303. Loop fastener web 618 may be positioned anywhere along the height of panel 606, but is preferably near the loop fastener web 616, to keep the fasteners away from a user's neck hair.

Figure 7:
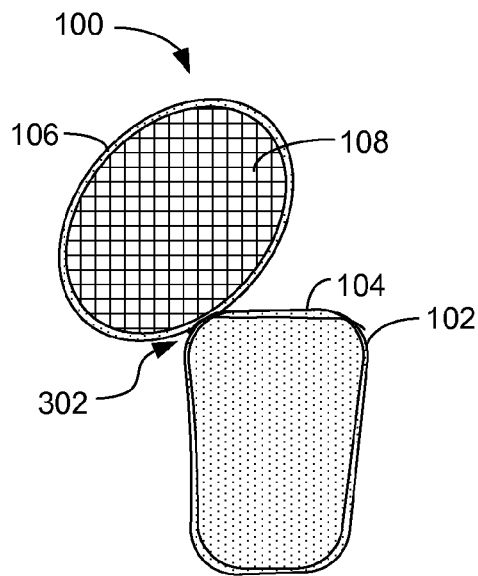
FIG. 7 is a side elevation view illustrating the exemplary pillow holder of FIG. 1 showing the tube and pillow preparing to be tucked into the enclosure, according to a preferred embodiment of the present invention.

FIG. 7 is a side elevation view illustrating the exemplary pillow holder 100 of FIG. 1 showing the flexible and resilient tube 106, or sleeve 106, and pillow 108 preparing to be tucked into the flexible and resilient fabric enclosure 102, according to a preferred embodiment of the present invention. The illustrated method of FIGS. 7-10 is used when the pillow holder 100 is not in use on a headrest 1303. The shape shown for the flexible and resilient fabric enclosure 102 is arbitrary, as the fabric may assume various shapes during the process. Flexible and resilient fabric enclosure 102 is flexibly coupled to flexible and resilient tube 106, or sleeve 106, by flexible coupling 302, about which flexible and resilient tube 106, or sleeve 106, and pillow 108 are being rotated into flexible and resilient fabric enclosure 102. Flexible and resilient tube 106, or sleeve 106, and pillow 108 will enter flexible and resilient fabric enclosure 102 through flexible closure 104.

Figure 8:
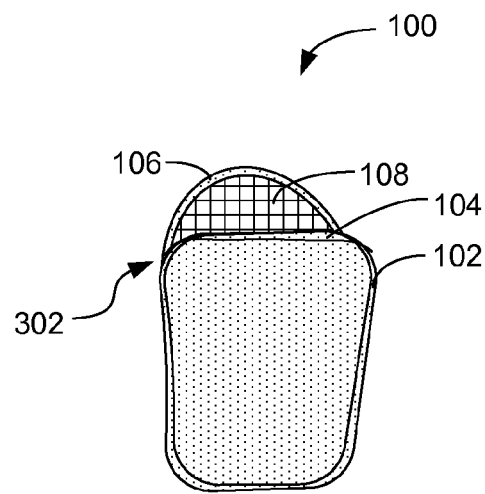
FIG. 8 is a side elevation view illustrating the exemplary pillow holder of FIG. 1 showing the tube and pillow being tucked into the enclosure, according to a preferred embodiment of the present invention.

FIG. 8 is a side elevation view illustrating the exemplary pillow holder 100 of FIG. 1 showing the flexible and resilient tube 106, or sleeve 106 and pillow 108 being tucked into the flexible and resilient fabric enclosure 102, according to a preferred embodiment of the present invention. In this view, almost all of flexible and resilient tube 106, or sleeve 106, and pillow 108 have rotated about flexible coupling 302 through flexible closure 104 to a position inside flexible and resilient fabric enclosure 102.

Figure 9:
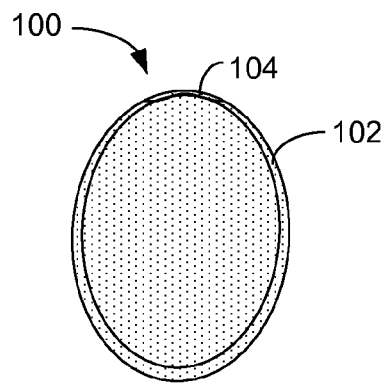
FIG. 9 is a side elevation view illustrating the exemplary pillow holder of FIG. 1 showing the tube and pillow tucked into the enclosure, according to a preferred embodiment of the present invention.

FIG. 9 is a side elevation view illustrating the exemplary pillow holder 100 of FIG. 1 showing the flexible and resilient tube 106, or sleeve 106, and pillow 108 tucked into the flexible and resilient fabric enclosure 102, according to a preferred embodiment of the present invention. In this view, flexible and resilient tube 106, or sleeve 106, and pillow 108 have rotated about flexible coupling 302 through flexible closure 104 to a position inside flexible and resilient fabric enclosure 102.

Figure 10:
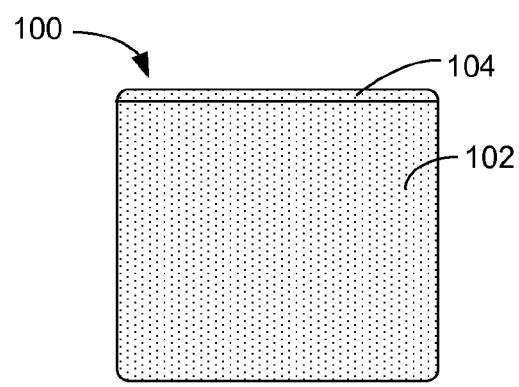
FIG. 10 is a front elevation view illustrating the exemplary pillow holder of FIG. 1 showing the tube and pillow tucked into the enclosure, according to a preferred embodiment of the present invention.

FIG. 10 is a front elevation view illustrating the exemplary pillow holder of FIG. 1 showing the flexible and resilient tube 106, or sleeve 106, and pillow 108 tucked into the flexible and resilient fabric enclosure 102, according to a preferred embodiment of the present invention. Flexible closure 104 may run along the top edge of flexible and resilient fabric enclosure 102, as shown, or may be constricted centrally to a closed position. The shape shown for flexible and resilient fabric enclosure 102 is arbitrary, as the flexible and resilient fabric enclosure 102 will take on various shapes, depending on the shape, size, and orientation of pillow 108 within the flexible and resilient fabric enclosure 102.

FIG. 11A is a side elevation view illustrating an exemplary pillow holder 1100, comprising the pillow holder of FIG. 1 and FIG. 9, showing the flexible and resilient tube 106, or sleeve 106, and pillow 108 tucked into the flexible and resilient fabric enclosure 102 and an exemplary strap 1102 coupled to the flexible and resilient fabric enclosure 102, according to a preferred embodiment of the present invention. Strap 1102 may be permanently attached to flexible and resilient fabric enclosure 102 or, in an alternate embodiment, may be releasably coupled to flexible and resilient fabric enclosure 102. In either case, it is preferable for the coupling to be located proximate the flexible closure 104.

FIG. 11B is a front elevation view illustrating the exemplary pillow holder 1100 of FIG. 11A showing the flexible and resilient tube 106, or sleeve 106, and pillow 108 tucked into the flexible and resilient fabric enclosure 102 and another exemplary strap 1104 coupled to the flexible and resilient fabric enclosure 102, according to a preferred embodiment of the present invention. Strap 1104 is coupled proximate ends of flexible closure 104, whereas strap 1102 is coupled across flexible closure 104.

FIG. 12A is a side elevation view illustrating the exemplary pillow holder 1200 showing an exemplary strap 1202 coupled to the flexible and resilient fabric enclosure 102, according to a preferred embodiment of the present invention. In this view, the exemplary pillow holder 1200 is partially installed on headrest 110, and the strap 1102 is shown with a releasable coupling 1204 in the middle.

FIG. 12B is a side elevation view illustrating the exemplary pillow holder 1200 of FIG. 12A, with an exemplary strap 1202 tucked into the flexible and resilient fabric enclosure 102 behind the headrest 110, according to a preferred embodiment of the present invention. The tucked strap 1202 creates an irregular bulge 1206 in flexible and resilient fabric enclosure 102. In an alternate embodiment, flexible and resilient fabric enclosure 102 may have a pocket for the tucked strap 1202, where the pocket may be internal or external.

FIG. 13 is a side elevation view illustrating another exemplary pillow holder 1300 showing the flexible and resilient fabric enclosure 1302 as a vertical band 1302 of fabric, according to a preferred embodiment of the present invention. Flexible and resilient fabric enclosure 1302 as a vertical band 1302 is an example of a flexible and resilient fabric enclosure 1302 that is not entire. The sides of headrest 1303 are not covered by this embodiment of flexible and resilient fabric enclosure 1302. Rather, the flexible and resilient fabric enclosure 1302 is a band of fabric around the headrest 1303 that is sized to fit between the headrest supports 202. Flexible and resilient tube 1306, or sleeve 1306, and pillow 1308 function in essentially the same way as for embodiment 100.

FIG. 14 is a side elevation view illustrating the exemplary pillow holder 1300 of FIG. 13 with the headrest 1303 raised, according to a preferred embodiment of the present invention. Flexible and resilient tube 1306, or sleeve 1306, and pillow 1308, have shifted position but still provide support for a user's neck. For the pillow 1308 to be effective in various positions of headrest 1303, pillow 1308 must be of the correct size for the particular headrest 1303 and must be flexibly coupled 302 to the flexible and resilient fabric enclosure 1302 near the bottom of the headrest 1303, as installed.

FIG. 15 is a side elevation view illustrating the exemplary pillow holder 1300 of FIG. 13, according to a preferred embodiment of the present invention. Flexible and resilient fabric enclosure 1302 is not visible behind headrest supports 202 because the flexible and resilient fabric enclosure 1302 goes between the headrest supports 202.

FIG. 16 is a front elevation view illustrating the exemplary pillow holder 1300 of FIG. 13, according to a preferred embodiment of the present invention. Because pillow holder 1300 has a narrower flexible and resilient fabric enclosure 1302 and narrower flexible and resilient tube 1306, or sleeve 1306, the pillow 1308 must be shorter than pillow 108, in order to maintain a stable orientation against movement of the user's head, neck, and shoulders.

Figure 17:
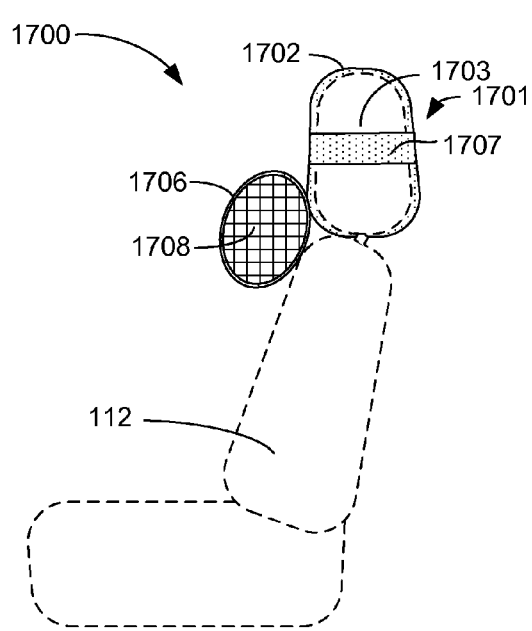
FIG. 17 is a side elevation view illustrating yet another exemplary pillow holder showing the enclosure as a vertical band of fabric and a horizontal band of fabric, according to a preferred embodiment of the present invention.

FIG. 17 is a side elevation view illustrating yet another exemplary pillow holder showing the flexible and resilient fabric enclosure 1701 as a vertical band of fabric 1702 and a horizontal band of flexible and resilient fabric 1707, according to a preferred embodiment of the present invention. Embodiment 1700 is an example of a flexible and resilient fabric enclosure 1701 that is not entire. The corners of headrest 1703 are not covered by flexible and resilient fabric enclosure 1701. Rather, flexible and resilient fabric enclosure 1701 includes a vertical band of fabric 1702 and a horizontal band of fabric 1707. Horizontal band of flexible and resilient fabric 1707 is preferably fixed to the front portion of the flexible and resilient vertical band of fabric 1702, and releasably fastens behind the headrest 1703. In another embodiment, horizontal band of fabric 1707 may be permanently sewn and may be stretched over headrest 1703 during installation. Embodiment 1700 is preferred for wheelchair headrests 1703. Flexible and resilient fabric enclosure 1701 is sized and shaped for a wheelchair headrest 1703, as is flexible and resilient tube 1706, or sleeve 1706, and pillow 1708.

Figure 18:
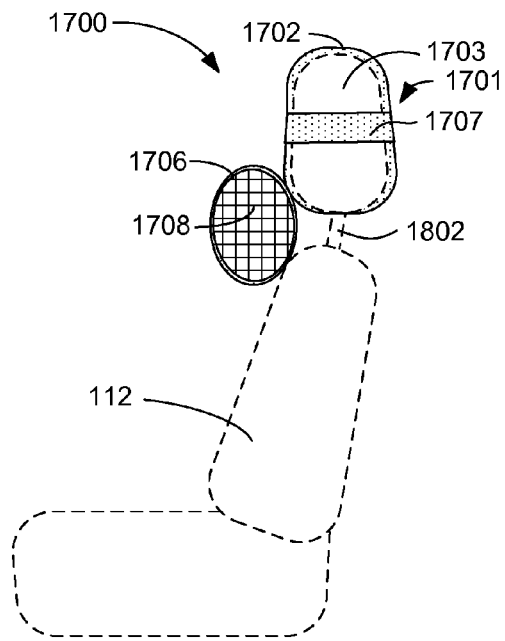
FIG. 18 is a side elevation view illustrating the exemplary pillow holder of FIG. 17 with the headrest raised, according to a preferred embodiment of the present invention.

FIG. 18 is a side elevation view illustrating the exemplary pillow holder 1700 of FIG. 17 with the headrest 1703 raised, according to a preferred embodiment of the present invention. Raising headrest supports 1802 shifts the position of flexible and resilient tube 1706, or sleeve 1706, and pillow 1708, but the pillow 1708 is still positioned to support the neck of a user.

Figure 19:
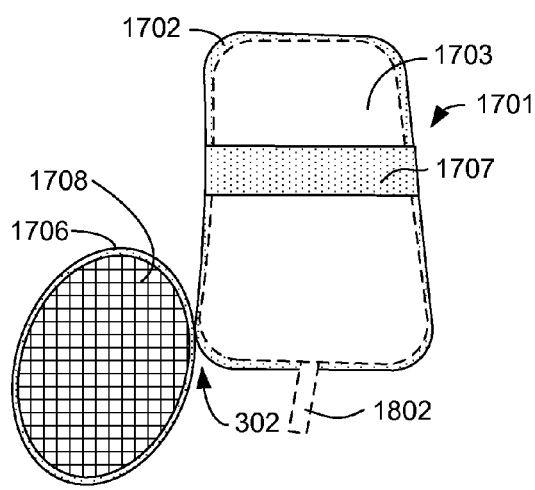
FIG. 19 is a side elevation view illustrating the exemplary pillow holder of FIG. 17, according to a preferred embodiment of the present invention.

FIG. 19 is a side elevation view illustrating the exemplary pillow holder 1700 of FIG. 17, according to a preferred embodiment of the present invention. Horizontal band of fabric 1707 may be of various widths. As with all the embodiments, the flexible and resilient fabric enclosure 1701 and the flexible and resilient tube 1706, or sleeve 1706, may by made entirely of resilient and flexible material, or partly of resilient and flexible fabric and partly of flexible and non-resilient fabric. For example, if an embodiment made of leather was desired, a portion of flexible and resilient tube 1706, or sleeve 1706 could be made of leather (flexible and non-resilient) with a panel of flexible and resilient material to provide the resiliency of the overall flexible and resilient tube 1706, or sleeve 1706 to retain pillow 1708. The flexible and resilient fabric enclosure 1701 can be made in the same way.

Figure 20:
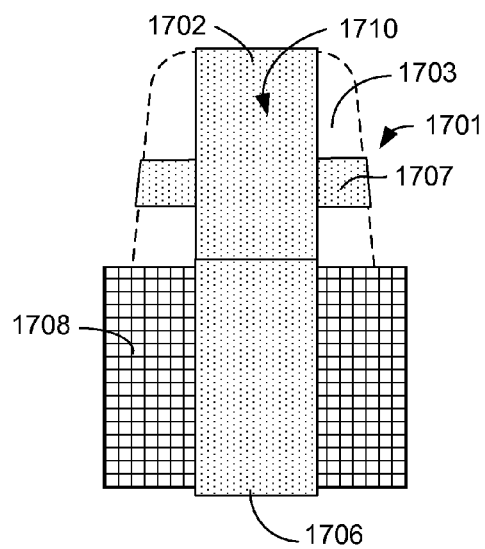
FIG. 20 is a front elevation view illustrating the exemplary pillow holder of FIG. 17, according to a preferred embodiment of the present invention.

FIG. 20 is a front elevation view illustrating the exemplary pillow holder 1700 of FIG. 17, according to a preferred embodiment of the present invention. In a particular embodiment, vertical band of fabric 1702 and a horizontal band of flexible and resilient fabric 1707 may be made as a single piece. Front surface 1710 may be equipped with additional couplings 3402 (see FIG. 34) for coupling a head pillow 3302 (see FIG. 33) to vertical band of fabric 1702, in additional to the pillow 1708.

Figure 21:
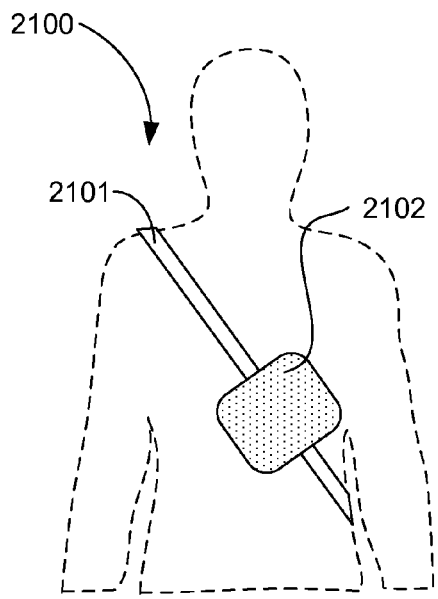
FIG. 21 is a front elevation view illustrating yet another exemplary pillow holder slidingly coupled to a shoulder strap, according to a preferred embodiment of the present invention.

FIG. 21 is a front elevation view illustrating yet another exemplary pillow holder 2100 including a flexible and resilient fabric enclosure 2102 slidingly coupled to a shoulder strap 2101, according to a preferred embodiment of the present invention. Shoulder strap 2101 is an extrapolation of straps 1102 and 1202, but with a slidable coupling to flexible and resilient fabric enclosure 2102. Flexible and resilient fabric enclosure 2102 contains flexible and resilient tube 2106, or sleeve 2106, and pillow 2108.

Figure 22:
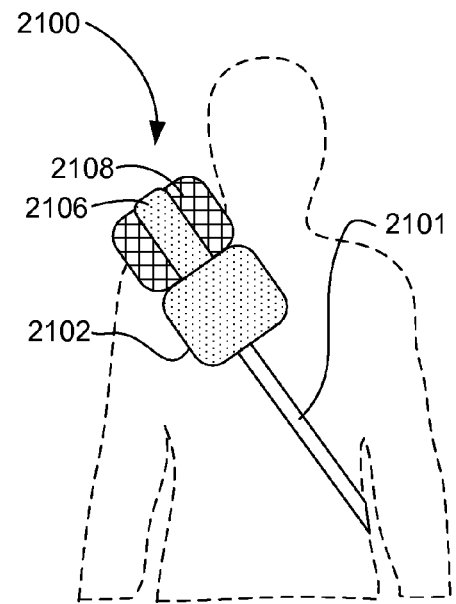
FIG. 22 is a front elevation view illustrating the exemplary pillow holder of FIG. 21 with the pillow and tube removed from the enclosure and slidingly positioned on the shoulder strap, according to a preferred embodiment of the present invention.

FIG. 22 is a front elevation view illustrating the exemplary pillow holder of FIG. 21 with the pillow 2108 and flexible and resilient tube 2106, or sleeve 2106, removed from the flexible and resilient fabric enclosure 2102, and slidingly positioned on the shoulder strap 2101, according to a preferred embodiment of the present invention. Flexible and resilient tube 2106, or sleeve 2106, is also slidingly coupled to shoulder strap 2101, allowing the flexible and resilient tube 2106, or sleeve 2106, to be moved slidingly along the shoulder strap with the flexible and resilient fabric enclosure 2102.

Figure 23:
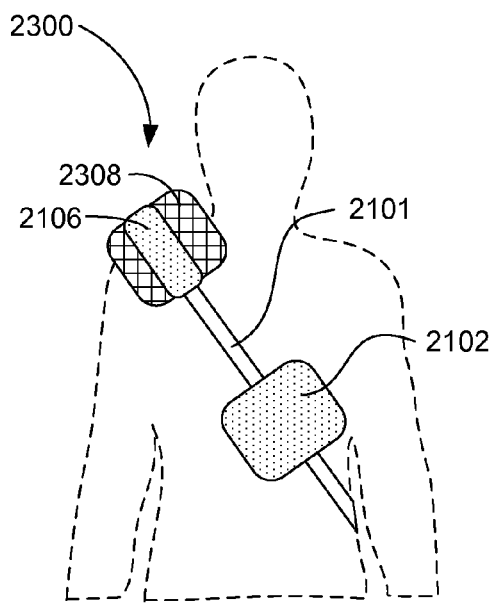
FIG. 23 is a front elevation view illustrating still yet another exemplary pillow holder with the pillow and tube uncoupled from the enclosure and slidingly positioned on the shoulder strap, according to a preferred embodiment of the present invention.

FIG. 23 is a front elevation view illustrating still yet another exemplary pillow holder 2300 with the pillow 2308 and flexible and resilient tube 2106, or sleeve 2106, uncoupled from the flexible and resilient fabric enclosure 2102 and slidingly positioned on the shoulder strap 2102, according to a preferred embodiment of the present invention. In this embodiment, the flexible and resilient tube 2106, or sleeve 2106, is releasably coupled to flexible and resilient fabric enclosure 2102. The flexible and resilient tube 2106, or sleeve 2106 has a small slidable coupling engaging the shoulder strap 2101.

Figure 24:
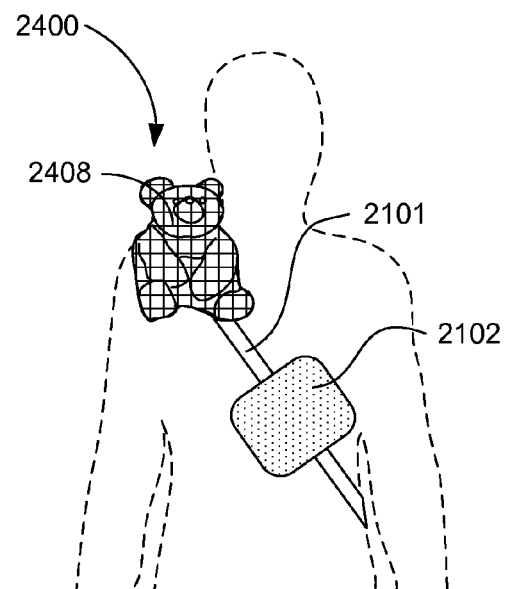
FIG. 24 is a front elevation view illustrating yet even another exemplary pillow holder with the pillow and tube uncoupled from the enclosure and slidingly positioned on the shoulder strap, wherein the pillow is a stuffed toy, according to a preferred embodiment of the present invention.

FIG. 24 is a front elevation view illustrating yet even another exemplary pillow holder 2400 with the pillow 2408 and flexible and resilient tube 2706, or sleeve 2706 (see FIG. 27), uncoupled from the flexible and resilient fabric enclosure 2102 and slidingly positioned on the shoulder strap 2102, wherein the pillow 2408 is a stuffed toy 2408, according to a preferred embodiment of the present invention. This embodiment has a smaller flexible and resilient tube 2706, or sleeve 2706, than previous embodiments.

Figure 25:
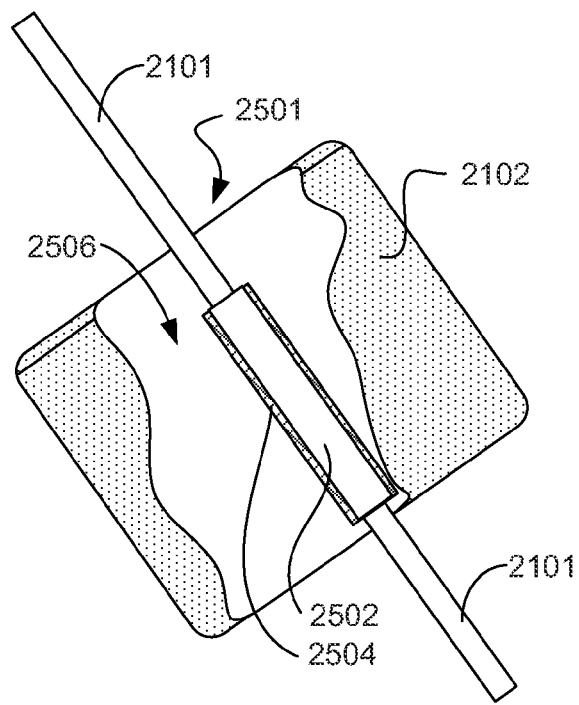
FIG. 25 is a cut away front elevation view illustrating the enclosure of FIGS. 21-24, showing an exemplary strap guide attached to the interior surface of the enclosure, according to a preferred embodiment of the present invention.

FIG. 25 is a cut away front elevation view illustrating the flexible and resilient fabric enclosure 2102 of FIGS. 21-24, showing an exemplary strap guide 2502 attached to the interior surface 2506 of the flexible and resilient fabric enclosure 2102, according to a preferred embodiment of the present invention. Strap guide 2502 is preferably of the same fabric as the flexible and resilient fabric enclosure 2102, and may be sewn in along seams 2504. Space 2501 is left above the strap guide 2502 to accommodate the slidable coupling on the flexible and resilient tube 2106, or sleeve 2106, or 2706.

Figure 26:
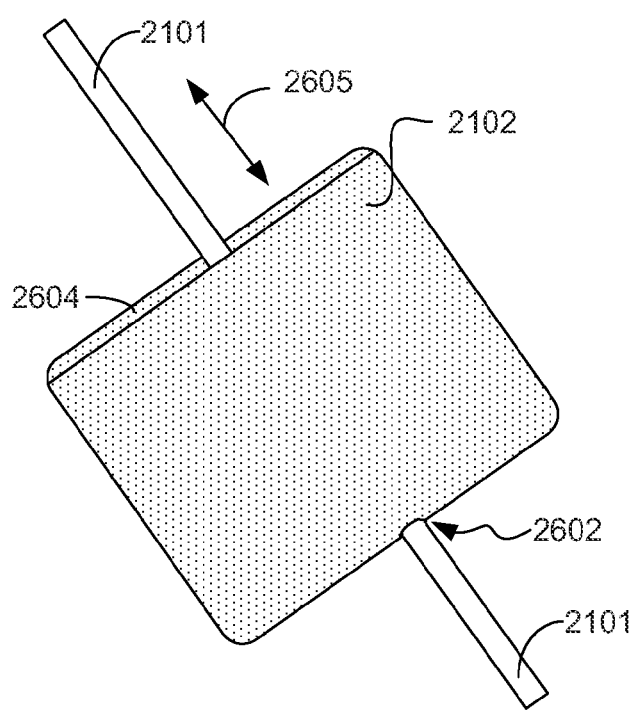
FIG. 26 is a front elevation view illustrating the enclosure of FIGS. 21-24, showing an exemplary distal opening of the enclosure, according to a preferred embodiment of the present invention.

FIG. 26 is a front elevation view illustrating the flexible and resilient fabric enclosure 2102 of FIGS. 21-24, showing an exemplary distal opening 2602 of the flexible and resilient fabric enclosure 2102, according to a preferred embodiment of the present invention. Distal opening 2602 is distal from flexible closure 2604. The strap 2101 preferably threads through the flexible and resilient fabric enclosure 2102 via distal opening 2602, then strap guide 2502, and then through flexible closure 2604. Flexible and resilient fabric enclosure 2102 can slide bi-directionally 2605 on shoulder strap 2101. Those of skill in the art, enlightened by this disclosure, will appreciate the various ways that strap 2101 may be threaded through or on flexible and resilient fabric enclosure 2102.

Figure 27:
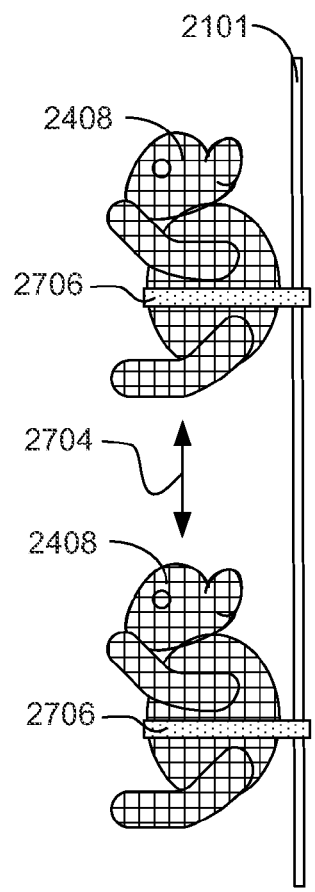
FIG. 27 is a side elevation diagrammatic view illustrating the sliding of the tube or sleeve of the exemplary pillow holder of FIG. 24, according to a preferred embodiment of the present invention.

FIG. 27 is a side elevation diagrammatic view illustrating the sliding of the flexible and resilient tube 2706, or sleeve 2706 of the exemplary pillow holder of FIG. 24 on shoulder strap 2101, according to a preferred embodiment of the present invention. In this embodiment, the flexible and resilient tube 2706, or sleeve 2706, appears as a belt for the stuffed toy 2408 and is slidingly coupled to shoulder strap 2101. Those of skill in the art, enlightened by this disclosure, will appreciate the various ways that flexible and resilient tube 2706, or sleeve 2106, may be slidingly coupled to shoulder strap 2101.

Figure 28:
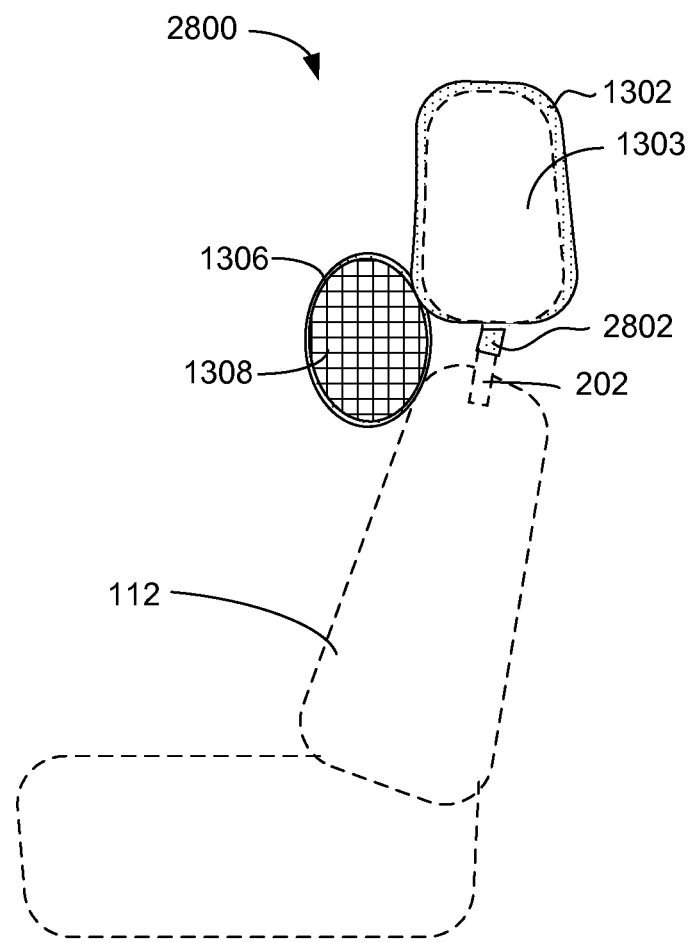
FIG. 28 is a side elevation view illustrating another exemplary pillow holder with coupling to the headrest support members, according to a preferred embodiment of the present invention.

FIG. 28 is a side elevation view illustrating another exemplary pillow holder 2800 with couplings 2802 to the headrest support members 202, according to a preferred embodiment of the present invention. This embodiment 2800 is a variation of embodiment 1300 or 1700, where the vertical band of material 1302 or 1702 passes between headrest support members 202, but adds couplings 2802, one for each headrest support 202. Couplings 2802 may be loops 2802, where the headrest 1303 is removed during pillow holder 2800 installation, and the headrest supports 202 are threaded through the loops 2802 before the vertical band of material 1032 or 1702 is fastened in place. In an alternate embodiment, couplings are made of two strips of fabric with hook and loop fasteners, snaps, or other fasteners.

Figure 29:
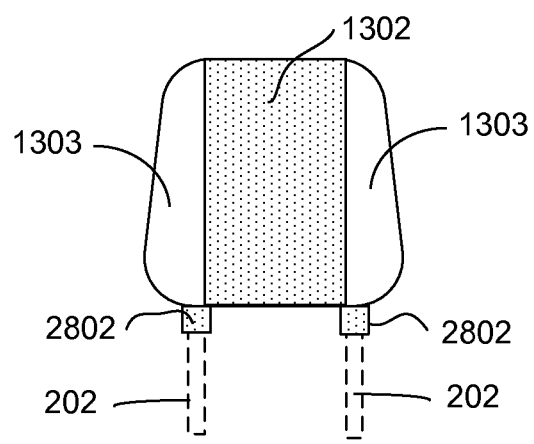
FIG. 29 is a front elevation view illustrating the enclosure and couplings of the exemplary pillow holder of FIG. 28, according to a preferred embodiment of the present invention.

FIG. 29 is a front elevation view illustrating the flexible and resilient fabric enclosure 1302 and couplings 2802 of the exemplary pillow holder 2800 of FIG. 28, according to a preferred embodiment of the present invention. By engaging the headrest supports 202, couplings 2802 provide additional security against the pillow holder 2800 moving. Couplings 2802 may be used with each embodiment 100, 1100, 1200, 1300, 1700, 2800, and 3300 that is adapted for use on a headrest 1303 or 1703.

Figure 30:
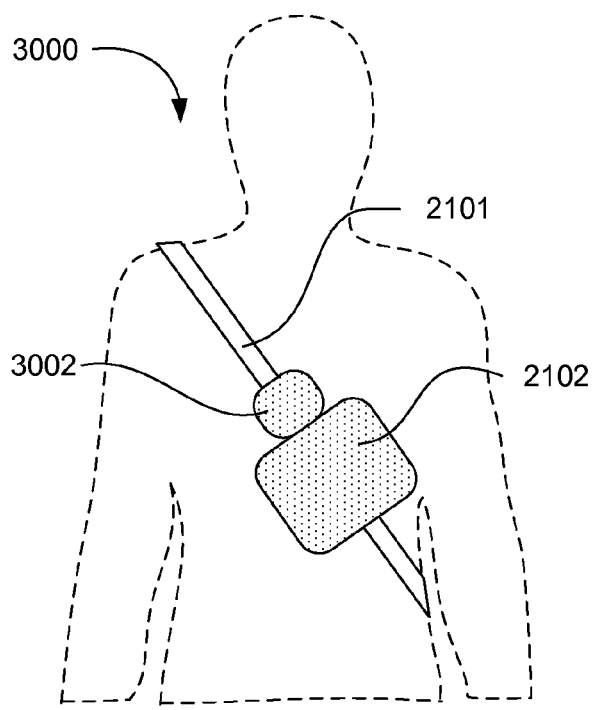
FIG. 30 is a front elevation view illustrating another exemplary pillow holder having first and second exemplary enclosures slidingly coupled to an exemplary shoulder strap, according to a preferred embodiment of the present invention.

FIG. 30 is a front elevation view illustrating another exemplary pillow holder 3000 having first and second exemplary enclosures 2106 and 3006 independently and slidingly coupled to an exemplary shoulder strap 2101, according to a preferred embodiment of the present invention. Fabric enclosure 3006 preferably contains a highly compressible pillow 3108 retained in flexible and resilient tube 3106, or sleeve 3106.

Figure 31:
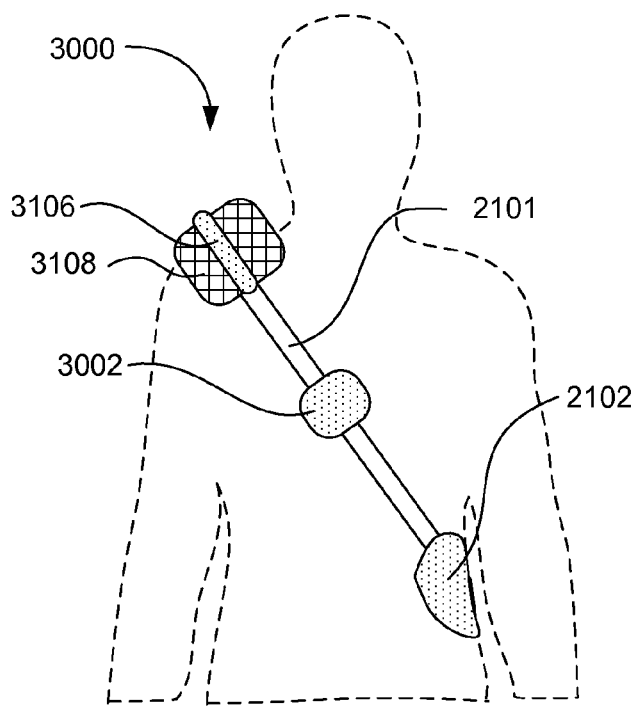
FIG. 31 is a front elevation view illustrating the exemplary pillow holder of FIG. 30 showing a second pillow and tube slidingly positioned as a shoulder pillow and a second enclosure on the user's hip, according to a preferred embodiment of the present invention.
Figure 32:
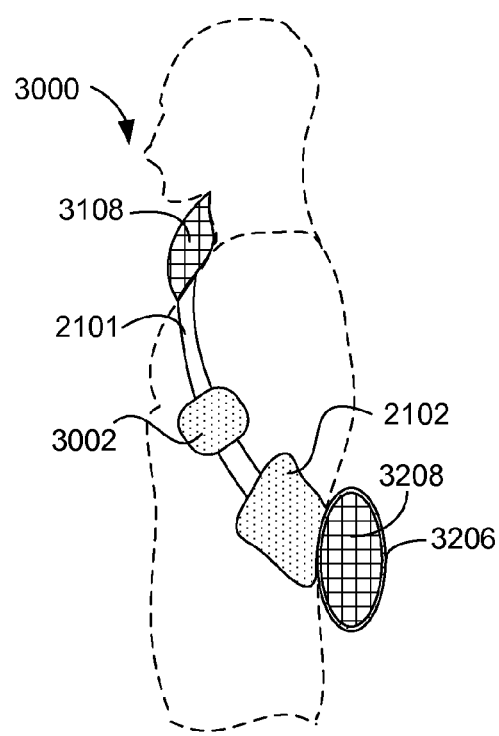
FIG. 32 is a side elevation view illustrating the exemplary pillow holder of FIG. 30 showing a second pillow and tube slidingly positioned as a shoulder pillow and a first pillow and sleeve positioned as a back pillow, according to a preferred embodiment of the present invention.
Figure 33:
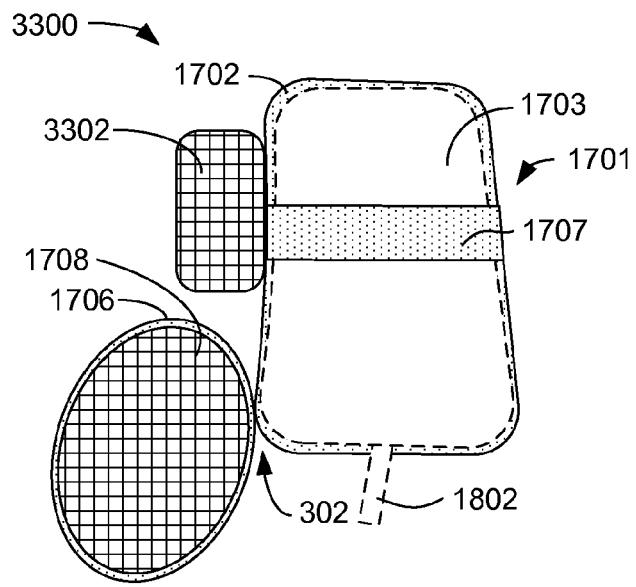
FIG. 33 is a side elevation view illustrating yet another exemplary pillow holder having at least one coupling for a head pillow, according to a preferred embodiment of the present invention.

FIG. 31 is a front elevation view illustrating the exemplary pillow holder 3000 of FIG. 30 showing a second pillow 3108 with a second flexible and resilient tube 3106, or sleeve 3106, and a second flexible and resilient fabric enclosure 3002 slidingly positioned as a shoulder pillow 3108 as well as a first flexible and resilient fabric enclosure 2102 on the user's hip, according to a preferred embodiment of the present invention. Second flexible and resilient fabric enclosure 3002 is made similarly to that in FIG. 25, but preferably smaller. In an alternate embodiment, first and second flexible and resilient fabric enclosures 2102 and 3002 may be the same size. FIG. 32 is a side elevation view illustrating the exemplary pillow holder 3000 of FIG. 30 showing a second pillow 3108 slidingly positioned as a shoulder pillow 3108 and a first pillow 3208 and flexible and resilient tube 3206, or sleeve 3206, and pillow 3208 positioned as a back pillow, according to a preferred embodiment of the present invention. Flexible and resilient tube 3206, or sleeve 3206 may be releasably coupled to flexible and resilient fabric enclosure 2102. FIG. 33 is a side elevation view illustrating yet another exemplary pillow holder 3300 having at least one coupling 3402 (see FIG. 34) for an exemplary head pillow 3302, according to a preferred embodiment of the present invention. Embodiment 3300 is like embodiment 1700 but with an option to add a head pillow 3302. Embodiment 3300 is a second preferred embodiment for wheelchair headrests.

Figure 34:
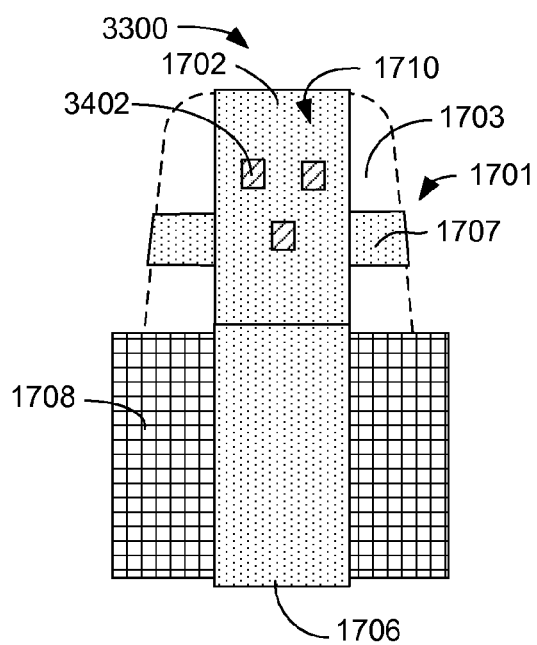
FIG. 34 is a front elevation view illustrating the exemplary pillow holder of FIG. 33, according to a preferred embodiment of the present invention.

FIG. 34 is a front elevation view illustrating the exemplary pillow holder 3300 of FIG. 33, but without head pillow 3302, according to a preferred embodiment of the present invention. One possible arrangement of releasable couplings 3402 (one of three labeled) is illustrated. Releasable couplings 3402 are preferably hook and loop fasteners.

Figure 35:
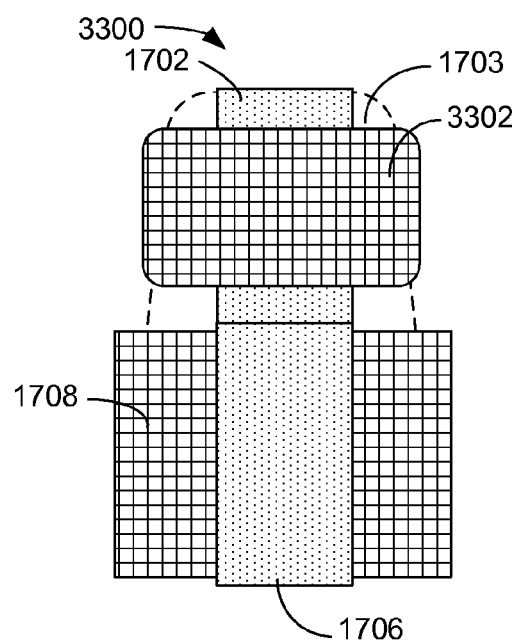
FIG. 35 is a front elevation view illustrating the exemplary pillow holder of FIG. 33, according to a preferred embodiment of the present invention.

FIG. 35 is a front elevation view illustrating the exemplary pillow holder 3300 of FIG. 33, according to a preferred embodiment of the present invention. An exemplary head pillow 3302 is shown releasably coupled to flexible and resilient fabric enclosure 1702.

Although the present inventor has described his preferred embodiments of this invention, it will be understood that the broadest scope of this invention includes modifications such as minor variations in patterns and colors as well as some variation in materials. Such scope is limited only by the below claims as read in connection with the above specification. Further, many other advantages of applicant's invention will be apparent to those skilled in the art from the above descriptions and the below claims.

I claim:

1. A pillow holder comprising:
   a. a flexible and resilient fabric enclosure having a flexible closure;
   b. a flexible coupling adjacent to said flexible closure operable to be coupled to said flexible and resilient fabric enclosure and operable to couple a flexible and resilient open-ended tube for receiving a first pillow to said flexible and resilient fabric enclosure;
   c. wherein said flexible and resilient fabric enclosure is sized and shaped to receive and retain at least a portion of a headrest of a vehicle through said flexible closure to support said tube and said first pillow, when said first pillow is received in said tube, in a position to enable said first, pillow to serve as a support for a user of such headrest;
   d. wherein such headrest has a top portion and a bottom portion, and said flexible coupling is permanently fixed proximate such bottom portion of such headrest; and wherein said flexible and resilient fabric enclosure is operable to receive said first pillow and at least a portion of said flexible coupling through said flexible closure, without being turned inside-out, when said flexible and resilient fabric enclosure is not receiving said at least said portion of such headrest when said pillow holder is installed on such headrest.

2. The pillow holder of claim 1, wherein said flexible coupling comprises said flexible and resilient fabric tube that is one of attached to and integral to said flexible and resilient fabric enclosure and is operable to receive and retain only a middle portion of said first pillow.

3. The pillow holder of claim 1, further comprising a strap coupled to said flexible and resilient fabric enclosure and extending outside of said enclosure.

4. The pillow holder of claim 3, further comprising a second pillow slidingly coupled to said strap, wherein said second pillow comprises at least one of:
   a. a standard-sized second pillow;
   b. a compressible and expandable second pillow operable to be compressed into a container that is part of said sliding coupling of said second pillow; and
   c. a stuffed toy.

5. The pillow holder of claim 3, wherein said strap is slidingly coupled to said flexible and resilient fabric enclosure.

6. The pillow holder of claim 4, wherein said second pillow is coupled to said flexible and resilient fabric enclosure by being slidingly coupled to said strap.

7. The pillow holder of claim 5, wherein said strap enters said flexible and resilient fabric enclosure through an opening in said flexible and resilient enclosure, wherein said opening comprises an opening distal from said flexible closure, and exits said flexible and resilient fabric enclosure through said flexible closure.

8. The pillow holder of claim 3, wherein said flexible and resilient fabric enclosure is further operable to receive and retain at least a portion of said strap while receiving and retaining such headrest.

9. The pillow holder of claim 1, wherein said flexible and resilient fabric enclosure comprises at least one additional coupling for coupling an additional pillow to said flexible and resilient fabric enclosure in vertical relation to said first pillow.

10. The pillow holder of claim 1, wherein said flexible closure comprises one of:
    a. an elastic closure; and
    b. a drawstring closure.

11. The pillow holder of claim 1, wherein said flexible and resilient fabric enclosure has a second opening, other than said flexible closure, to an exterior of said flexible and resilient fabric enclosure, when said flexible closure is closed.

12. A pillow holder comprising:
    a. a flexible and resilient fabric enclosure having at least one opening and a flexible closure;
    b. a coupling adjacent to said flexible closure coupled to said flexible and resilient fabric enclosure and operable to couple a flexible and resilient open-ended tube for receiving a first pillow to said flexible and resilient fabric enclosure;
    c. wherein said flexible and resilient fabric enclosure is sized and shaped to receive and retain at least a portion of a headrest of a vehicle through said flexible closure to support said tube and said first pillow, when said first pillow is received in said tube, in a position to enable said first pillow to serve as a support for a user of such headrest;
    d. wherein said flexible and resilient fabric enclosure is operable to receive said tube and said first pillow and at least a portion of said coupling when said flexible and resilient fabric enclosure is not receiving said at least said portion of said headrest; and
    e. wherein such headrest has a top portion and a bottom portion, and said flexible coupling is permanently fixed proximate such bottom portion of such headrest when said pillow holder is installed on such headrest.

13. The pillow holder of claim 12, wherein said coupling comprises said flexible and resilient fabric tube that is one of attachable to and integral to said flexible and resilient fabric enclosure and is operable to receive and retain only a middle portion of said first pillow.

14. The pillow holder of claim 12, further comprising a strap coupled to said flexible and resilient fabric enclosure and extending outside of said enclosure.

15. The pillow holder of claim 14, wherein said strap extending outside of said enclosure is slidingly coupled to said flexible and resilient fabric enclosure.

16. The pillow holder of claim 15, further comprising a second pillow that is coupled to said flexible and resilient fabric enclosure by being slidingly coupled to said strap wherein said second pillow comprises at least one of:
   a. a standard-sized second pillow;
   b. a compressible and expandable second pillow operable to be compressed into a container that is part of said sliding coupling of said second pillow; and
   c. a stuffed toy.

17. The pillow holder of claim 14, wherein said flexible and resilient fabric enclosure is further operable to receive and retain at least a portion of said strap normally extending outside of said enclosure while receiving and retaining such headrest.

18. The pillow holder of claim 12, wherein said flexible and resilient fabric enclosure has a second opening, other than said flexible closure, to an exterior of said flexible and resilient fabric enclosure, when said flexible closure is closed.

19. A pillow holder comprising:
   a. a flexible and resilient fabric enclosure having at least one opening and a flexible closure, wherein said flexible and resilient fabric enclosure comprises one of:
      i. a unitary enclosure that has no opening when said flexible closure is closed;
      ii. a unitary enclosure that includes an opening when said flexible closure is closed;
      iii. a multipart enclosure having no opening when said flexible closure is closed; and
      iv. a multipart enclosure having an opening when said flexible closure is closed;
   b. a coupling coupled to said flexible and resilient fabric enclosure and operable to couple a flexible and resilient open-ended tube for receiving a first pillow to said flexible and resilient fabric enclosure, wherein said coupling comprises at least one of:
      i. said flexible and resilient fabric tube that is one of attached to and integral to said flexible and resilient fabric enclosure and is operable to receive and retain only a middle portion of said first pillow; and
      ii. a strap coupled to said flexible and resilient fabric enclosure, wherein said strap is at least one of:
         1) releasably coupled to said flexible and resilient fabric enclosure;
         2) slidingly coupled to said flexible and resilient fabric enclosure; and
         3) fixedly coupled to said flexible and resilient fabric enclosure;
   c. wherein said flexible and resilient fabric enclosure is sized and shaped to receive and retain:
      i. at least a portion of a headrest through said flexible closure to support said tube for receiving said first pillow, when said first pillow is received in said tube and coupled to said flexible and resilient fabric enclosure in a position to enable said first pillow to serve as a support for a user of such headrest, wherein such headrest has a top portion and a bottom portion, and said flexible coupling is permanently fixed proximate such bottom portion of such headrest when said pillow holder is installed on such headrest; and
      ii. at least a portion of said strap;
   d. wherein said flexible and resilient fabric enclosure is operable to receive said tube and said first pillow and at least a portion of said flexible coupling, without being turned inside out, when said flexible and resilient fabric enclosure is not receiving said at least said portion of such headrest; and
   e. further comprising a second pillow slidingly coupled to said strap, wherein said second pillow comprises at least one of:
      i. a standard-sized second pillow;
      ii. a compressible and expandable second pillow operable to be compressed into a container that is part of said sliding coupling of said second pillow; and
      iii. a stuffed toy.

\* \* \* \* \*